United States Patent [19]
Zuloaga, Jr. et al.

[11] Patent Number: 5,390,220
[45] Date of Patent: Feb. 14, 1995

[54] LOWER TIE PLATE STRAINERS INCLUDING HELICAL SPRING STRAINERS FOR BOILING WATER REACTORS

[75] Inventors: Jaime A. Zuloaga, Jr., Wilmington; Eric B. Johansson, Wrightsville Beach, both of N.C.

[73] Assignee: General Electric Company, San Jose, Calif.

[21] Appl. No.: 158,550

[22] Filed: Nov. 29, 1993

[51] Int. Cl.⁶ ............... G21C 3/04; G21C 19/04
[52] U.S. Cl. ............................. 376/313; 376/352
[58] Field of Search .................. 376/352, 313, 443

[56] References Cited

U.S. PATENT DOCUMENTS

| | | |
|---|---|---|
| 1,240,081 | 9/1917 | Moss . |
| 1,504,233 | 8/1924 | Graham . |
| 1,992,472 | 2/1935 | Craig . |
| 3,414,474 | 12/1968 | Swanson . |
| 3,528,885 | 9/1970 | Kumpf . |
| 3,725,199 | 4/1973 | Notari et al. . |
| 3,801,453 | 4/1974 | Jones . |
| 3,840,051 | 10/1974 | Akashi et al. . |
| 3,878,870 | 4/1975 | Atherton et al. . |
| 3,879,259 | 4/1975 | Persson et al. . |
| 3,945,883 | 3/1976 | Hind et al. . |
| 3,971,698 | 7/1976 | Wolff et al. . |
| 4,032,398 | 6/1977 | Cross et al. . |
| 4,036,690 | 7/1977 | Betts et al. . |
| 4,053,358 | 10/1977 | Pennell . |
| 4,053,359 | 10/1977 | Pennell et al. . |
| 4,076,586 | 2/1978 | Bideau et al. . |
| 4,096,032 | 6/1978 | Mayers et al. . |
| 4,116,764 | 9/1978 | Jones . |
| 4,198,272 | 4/1980 | Salmon . |
| 4,412,969 | 11/1983 | Tilbrook et al. . |
| 4,420,457 | 12/1983 | Le Pargneux . |
| 4,427,624 | 1/1984 | Marlatt et al. . |
| 4,446,099 | 5/1984 | Schwind et al. . |
| 4,505,877 | 3/1985 | Rion . |
| 4,610,838 | 9/1986 | Gasparro et al. . |
| 4,614,636 | 9/1986 | Walters . |
| 4,615,862 | 10/1986 | Huckstein . |
| 4,636,525 | 1/1987 | Yant . |
| 4,652,425 | 3/1987 | Ferrari et al. . |
| 4,655,995 | 4/1987 | Freeman et al. . |
| 4,664,880 | 5/1987 | Bryan . |
| 4,678,627 | 7/1987 | Rylatt . |
| 4,684,495 | 8/1987 | Wilson et al. . |
| 4,684,496 | 8/1987 | Wilson et al. . |
| 4,716,012 | 12/1987 | Gasparro et al. . |
| 4,772,447 | 9/1988 | Manson et al. . |
| 4,781,884 | 11/1988 | Anthony . |

(List continued on next page.)

FOREIGN PATENT DOCUMENTS 90104066  6/1990  China .

(List continued on next page.)

*Primary Examiner*—Behrend E. Harvey
*Attorney, Agent, or Firm*—J. E. McGinness

[57] ABSTRACT

A debris catching arrangement is disclosed for incorporation within the flow plenum up stream or below the rod supporting grid of the lower tie plate assembly. The device is preferably placed within the lower tie plate flow plenum between the fuel bundle inlet orifice and the rod supporting grid structure supporting the fuel rods; alternate placement can include any inlet channel upstream of the fuel rods including the fuel support casting. The disclosed debris catching designs include successive side-by-side coil springs placed in layers across the tie plate plenum. Preferably, the respective tie plates are placed in alternating directions with a first layer of springs oriented at 90° to an alternate and underlying layer of springs. Multiple layers of such springs are used with four layers being preferred. At their respective crossing points, the springs of adjacent layers are joined—as by welding—with the result that the filter is a solid unitary mass.

8 Claims, 4 Drawing Sheets

U.S. PATENT DOCUMENTS

| | | |
|---|---|---|
| 4,826,653 | 5/1989 | Nylund et al. . |
| 4,828,791 | 5/1989 | DeMario . |
| 4,832,905 | 5/1989 | Bryan et al. . |
| 4,849,161 | 7/1989 | Brown et al. . |
| 4,900,507 | 2/1990 | Shallenberger et al. . |
| 4,919,883 | 4/1990 | Bryan et al. . |
| 4,980,121 | 12/1990 | Roberts et al. . |
| 5,009,839 | 4/1991 | King . |
| 5,024,806 | 6/1991 | Cioffi et al. . |
| 5,024,807 | 6/1991 | Hatfield et al. . |
| 5,030,412 | 7/1991 | Yates et al. . |
| 5,037,605 | 8/1991 | Riordan, III . |
| 5,066,453 | 11/1991 | Heppenstoll et al. ................ 376/352 |
| 5,071,617 | 12/1991 | Bryan et al. . |
| 5,094,802 | 3/1992 | Riordan, III . |
| 5,100,611 | 3/1992 | Nylund . |
| 5,106,575 | 4/1992 | Nakamura et al. . |
| 5,128,096 | 7/1992 | Grattier . |
| 5,135,710 | 8/1992 | Grattier et al. . |
| 5,160,697 | 11/1992 | Verdier et al. . |
| 5,180,545 | 1/1993 | Grattier . |
| 5,219,517 | 6/1993 | Nylund . |
| 5,230,861 | 7/1993 | Nylund ................................ 376/352 |
| 5,282,231 | 1/1994 | Adams et al. . |

FOREIGN PATENT DOCUMENTS

| | | |
|---|---|---|
| 0196611 | 8/1986 | European Pat. Off. . |
| 0289829 | 9/1988 | European Pat. Off. . |
| 0311037 | 12/1989 | European Pat. Off. . |
| 0432738A1 | 6/1991 | European Pat. Off. . |
| 0432739A1 | 6/1991 | European Pat. Off. . |
| 0435744A1 | 7/1991 | European Pat. Off. . |
| 0455011A1 | 11/1991 | European Pat. Off. . |
| 0466553A1 | 1/1992 | European Pat. Off. . |
| 4006264A1 | 8/1991 | Germany . |
| 54-19080 | 2/1979 | Japan . |
| 54-102493 | 8/1979 | Japan . |
| 54-141989 | 11/1979 | Japan . |
| 0141989 | 11/1979 | Japan ................................. 376/352 |
| 57-102215 | 9/1982 | Japan . |
| 60-162985 | 8/1985 | Japan . |
| 62-96891 | 4/1987 | Japan . |
| 63-61183 | 3/1988 | Japan . |
| 63-157093 | 6/1988 | Japan . |
| 64-39593 | 2/1989 | Japan . |
| 64-83189 | 3/1989 | Japan . |
| 3-274491 | 3/1991 | Japan . |
| 3-111795 | 5/1991 | Japan . |
| 465644 | 10/1991 | Sweden ............................... 376/352 |
| 1214998 | 9/1970 | United Kingdom . |

LOWER TIE PLATE STRAINERS INCLUDING HELICAL SPRING STRAINERS FOR BOILING WATER REACTORS

In a boiling water nuclear reactor fuel bundle, a debris catching arrangement is disclosed for incorporation within the flow volume between the inlet nozzle and the rod supporting grid of the lower tie plate assembly. The particular debris catcher arrangement includes a matrix of coil springs loaded preferably within the lower tie plate flow plenum of the lower tie plate between the inlet nozzle and the bottom of the rod supporting grid.

BACKGROUND OF THE INVENTION

Boiling water nuclear reactors operate for many years. Commencing with their initial construction and through their service lives, these reactors may accumulate debris in their closed circulation moderator systems. This debris can become an operating hazard if the debris is allowed to enter into the fuel bundle containing core region having the heat generating fuel rods. In order to understand this problem, a summary of reactor construction as it relates to the accumulation of debris in the core needs first to be given. Thereafter, fuel bundle construction will be set forth. Emphasis will be given to the need to preserve substantially unchanged the regions of pressure drop within the fuel bundles. Thereafter, the effects caused by debris entering into the fuel rod region of the fuel bundles will be summarized.

Boiling water nuclear reactor construction can be simply summarized for purposes of understanding the debris entrainment problem. Such nuclear reactors are provided with a large, central core. Liquid water coolant/moderator flow enters the core from the bottom and exits the core as a water steam mixture from the top.

The core includes many side-by-side fuel bundles. Water is introduced into each fuel bundle through a fuel bundle support casting from a high pressure plenum which is situated below the core. Water passes in a distributed flow through the individual fuel bundles, is heated to generate steam, and exits the upper portion of the core as a two phase water steam mixture from which the steam is extracted for the generation of energy.

The core support castings and fuel bundles are a source of pressure loss in the circulation of water through the core. This pressure loss assures the substantially even distribution of flow across the individual fuel bundles of the reactor core. When it is remembered that there are as many as 750 individual fuel bundles in a reactor core, it can be appreciated that assurance of the uniformity of flow distribution is important. To interfere with the pressure drop within the fuel bundles could affect the overall distribution of coolant/moderator within the fuel bundles of the reactor core.

Having set forth the construction of the boiling water nuclear reactor in so far as is appropriate, attention can now be directed to the construction of the fuel bundles themselves.

The fuel bundles for a boiling water nuclear reactor include a fuel rod supporting lower tie plate assembly, which lower tie plate assembly is a cast structure. The lower tie plate assembly includes at its lowest point a downward protruding bail covering an inlet nozzle. This inlet nozzle includes entry to an enlarged flow volume within the lower tie plate. At the upper end of the flow volume, there is located a rod supporting grid. Between the supporting grid and the nozzle there is defined a flow volume.

The rod supporting grid has two purposes. First, the rod supporting grid provides the mechanical support connection for the weight of the individual fuel rods to be transmitted through the entire lower tie plate to the fuel support casting. Secondly, the rod supporting grid provides a flow path for liquid water moderator into the fuel bundle for passage between the side-by-side supported fuel rods.

Above the lower tie plate, each fuel bundle includes a matrix of upstanding fuel rods—sealed tubes each containing fissionable material which when undergoing nuclear reaction produce the power generating steam. The matrix of upstanding fuel rods includes at the upper end a so-called upper tie plate. This upper tie plate holds at least some of the fuel rods in vertical side-by-side alignment. Some of the fuel rods are attached to both the upper and lower tie plates. Usually, there are included between the upper and lower tie plates water rods for improvement of the water moderator to fuel ratio, particularly in the upper, highest void fraction region of the fuel bundle.

Fuel bundles also include about seven fuel rod spacers at varying elevations along the length of the fuel bundle. These spacers are required because the fuel rods are long (about 160 inches) and slender (about 0.4 to 0.5 inches in diameter), and would come into abrading contact under the dynamics of fluid flow and nuclear power generation within the fuel bundles. The spacers provide appropriate restraints for each fuel rod at their respective elevations and thus prevent abrading contact between the fuel rods and maintain the fuel rods at uniform spacing relative to one another along the length of the fuel bundle for optimum performance. As will hereafter be developed, these spacers are sites where debris can be trapped and damage the fuel rods.

Each fuel bundle is surrounded by a channel. This channel causes water flowing between the tie plates to be restricted to only one bundle in an isolated flow path between the tie plates. The channel also serves to separate the steam generating flow path through the fuel bundles from the surrounding core bypass region, this region being utilized for the penetration of the control rods. The water in the bypass region also provides neutron moderation.

In the operation of a boiling water nuclear reactor, it is important to understand that the maintenance of the originally designed flow distribution is important. Specifically, from the lower (high pressure) plenum inlet to the core to the outlet from the core of the steam and water mixture through the upper tie plates of the fuel bundles, about 20 pounds per square inch (psi) of pressure drop is encountered at typical 100% power/100% flow operating conditions. About 7 to 8 psi of this pressure drop occurs through the fuel support casting. This pressure drop is mainly to assure the uniform distribution of coolant/moderator flow through the many fuel bundles making up the core of the reactor and is related to the prevention of operating instabilities within the reactor at certain power rates of the reactor. At the lower tie plate of each fuel bundle, from the inlet nozzle into the flow volume and through the fuel rod supporting grid, about 1 to 1½ psi pressure drop occurs which contributes to establishing flow distribution between the individual fuel rods of each fuel bundle. Finally, through the fuel bundle itself—from the lower supporting grid to the exit at the upper tie plate—about 11 psi of pressure drop usually occurs.

When new fuel bundles are introduced into a reactor core, these pressure drops must be preserved. Otherwise, the coolant/moderator flow distribution could be compromised.

Having summarized the construction and operation of a boiling water nuclear reactor, the problem of debris resident within the closed circulation moderator system of the reactor can now be understood. Typically debris within boiling water nuclear reactors can include extraneous materials left over from reactor construction. Further, corrosion during the reactor lifetime also liberates debris. Finally, and during the numerous outages and repairs, further debris accumulates. It will therefore be understood that nuclear reactors constitute closed circulation systems that essentially accumulate debris with increasing age.

It has been discovered that a particularly vexing and usual place for the accumulation of debris is in the fuel bundles between the fuel rods particularly in the vicinity of the fuel rod spacers. It will be remembered that each fuel rod is surrounded by the spacer at the particular elevation of the spacer. Debris particles tend to lodge between the spacer structure and the fuel rods and often dynamically vibrate with the coolant/moderator flow in abrading contact to the sealed cladding of the fuel rods. Such flow induced vibration within the reactor, can and has both damaged—as by fretting—as well as ruptured the cladding of the fuel rods. If a sufficient number of cladding ruptures occurs, plant shutdown could be necessary.

It is to be understood that modern nuclear plants have both redundancy and many safety systems designed to counter act anticipated operating casualties, such as fuel rods becoming punctured by debris. Such failures are not catastrophic. However, in almost all cases they result in the plant operating at less than optimum efficiency. Thus, it is highly desirable to reduce the incidence of debris damage to fuel rods.

It will be further understood that to a certain extent the rod supporting grid of the fuel bundle acts as a strainer. Debris exceeding the dimension of the grid cannot pass to the fuel bundles. However, it has been found that debris—especially debris with "sail areas'—'—such as metal shavings, wire and the like—work past the rod supporting grid and can become lodged between the fuel rods and spacers.

SUMMARY OF THE PRIOR ART

Prior art attempts at the placement of devices for preventing debris from entering into the regions of the fuel rods have included alteration of the grid support structure of the lower tie plate assembly. In Nylund U.S. Pat. No. 5,100,611 issued Mar. 31, 1992, an alteration to the grid structure is disclosed. This alteration includes replacing the required through holes of the grid structure with flow channel parts that have center lines that are non-collinear. Because these flow channels are part of the fuel rod supporting grid, the size of the through holes is necessarily large to preserve the rod supporting grid strength and the area over which the holes are distributed is only co-extensive to the lower tie plate assembly at the supporting grid.

Attempts to screen debris have been made in pressurized water reactors. In Bryan U.S. Pat. No. 4,664,880 issued May 12, 1987 a wire mesh debris trap is utilized at the bottom of a pressurized water reactor fuel bundle. In Rylatt U.S. Pat. No. 4,678,627 issued Jul. 7, 1987, this structure is modified to include a debris retaining trap. These pressurized water reactor fuel bundles constitute open structures and lack the channel confined flow path between the upper and lower tie plates common to boiling water nuclear reactors. The channel structure, required in boiling water nuclear reactor construction, is wholly absent in pressurized water reactor construction. Since flow can occur between adjacent fuel bundles in a pressurized water reactor along the entire length of the fuel bundles, the placement of the disclosed screens and traps does not occur within a confined flow path. Further, such fuel bundles lack the disclosed lower tie plate assembly utilized with boiling water reactors including the inlet nozzle, and the defined flow volume to rod supporting grid at the bottom of the fuel bundles.

In one prior art debris catching device, the lower tie plate is modified with serpentine path—almost in the form of a chevron. Overlying this construction there are placed rod supporting bars so that the weight of the rods does not crush the underlying serpentine path.

SUMMARY OF THE INVENTION

In a boiling water nuclear reactor fuel bundle, a debris catching arrangement is disclosed for incorporation within the flow plenum upstream or below the rod supporting grid of the lower tie plate assembly. The device is preferably placed within the lower tie plate flow plenum between the fuel bundle inlet orifice and the rod supporting grid structure supporting the fuel rods; alternate placement can include any inlet channel upstream of the fuel rods including the fuel support casting. The disclosed debris catching designs include successive side-by-side coil springs placed in layers across the tie plate plenum. Preferably, the respective layers are placed in alternating directions with a first layer of springs oriented at 90° to an alternate and underlying layer of springs. Multiple layers of such springs are used with four layers being preferred. At their respective crossing points, the springs of adjacent layers are joined—as by welding—with the result that the filter is a solid unitary mass.

BRIEF DESCRIPTION OF THE DRAWINGS

Other objects, features and advantages of the above invention will become more apparent after referring to the following specification and attached drawings in which.

DESCRIPTION OF THE PREFERRED EMBODIMENT

Figure 1:
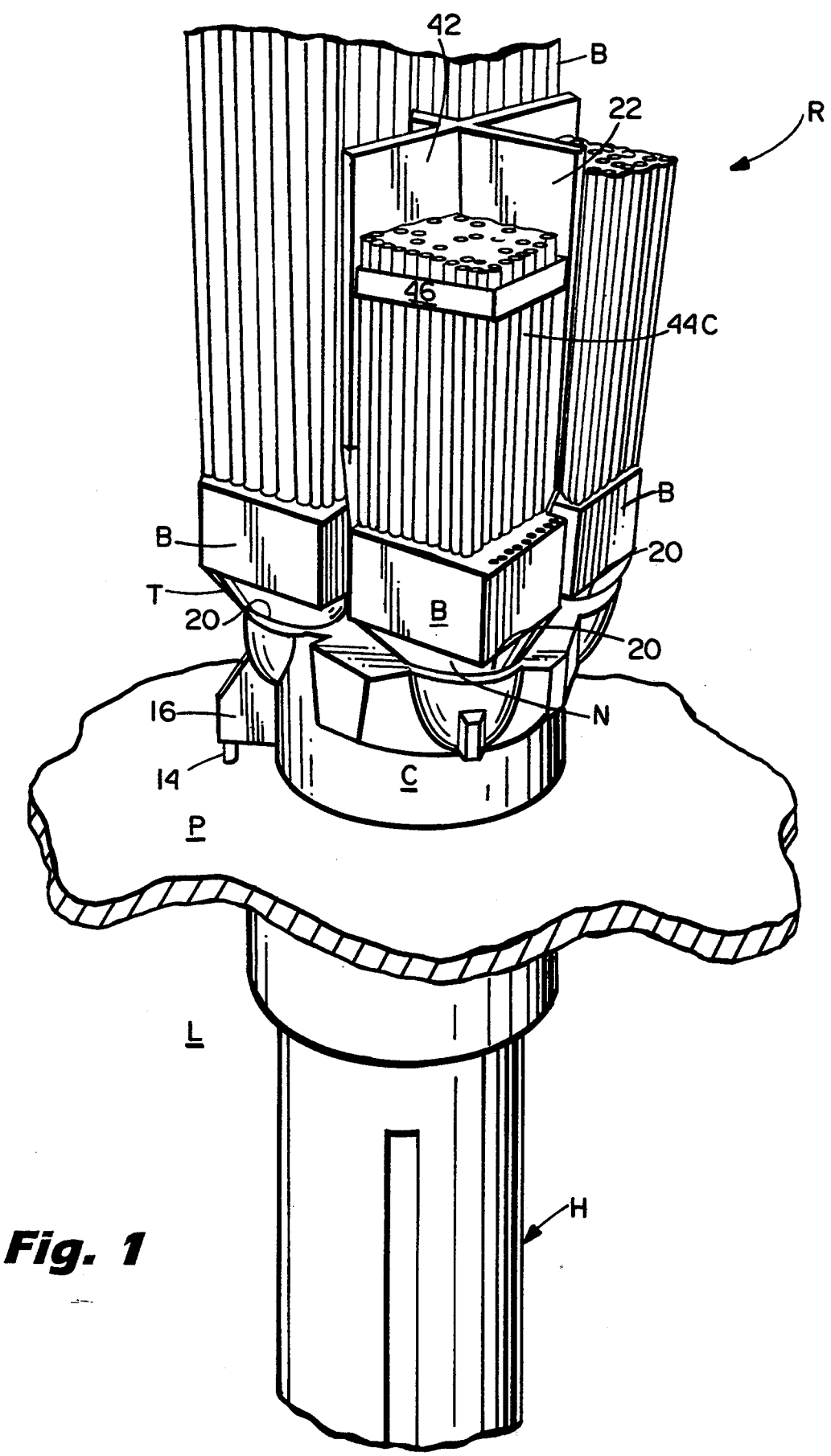
FIG. 1 is a perspective view of a portion of the lower high pressure plenum, the fuel support casting, and four supported fuel rods on the fuel support casting, thus illustrating plenums down stream of the rod supporting grid in which the strainers of this invention can be located.

Referring to FIG. 1, a pertinent detail of a portion of a reactor core is shown. Control rod drive housing H has fuel support casting C supported thereon. Fuel support casting C includes arm 16 which orients casting C with respect to pin 14 in core plate P.

Core plate P divides high pressure lower plenum L from core R, preserving the necessary pressure differential barrier to cause the controlled circulation within the many individual fuel bundles of the reactor.

Fuel support casting C includes four apertures 20 onto which four fuel bundles B at their respective lower tie plate assemblies T are placed. Each lower tie plate assembly T is disposed to cause its inlet nozzle N to communicate to one of the apertures 20 of the fuel support casting.

Fuel support casting C also includes apertures through which control rods 22 penetrate to the interstices of the four fuel bundles sitting on top of the fuel support casting C. Since the action of the control rods is not important with respect to this invention, further discussion of this aspect of the reactor will not be included.

Remembering that only four out of a possible 750 fuel bundles are illustrated, it will be understood that the pressure drop across core plate P is important. Accordingly, a review of the pressure drop within a boiling water nuclear reactor can be instructive.

First, and through an orifice (not shown) in the fuel support casting C, an approximate 7 to 8 psi pressure drop occurs at typical 100% power/100% flow operating conditions. This pressure drop is utilized to ensure uniform distribution of bundle coolant flow through the many (up to 750) fuel bundles within a boiling water nuclear reactor.

Secondly, at in the lower tie plate of the fuel bundles on each fuel support casting C, approximately 1½ psi of pressure drop occurs. This pressure drop is a result primarily of the change in flow velocity occurring through this complex geometry structure.

Finally, and as the coolant rises and generates steam within the fuel bundle, approximately 10 to 12 psi of pressure drop is incurred. This pressure drop is distributed throughout the length of the fuel bundle - and is important to the operating stability of both the individual fuel bundles and the collective fuel bundles constituting the core of the nuclear reactor.

The reader should understand that the summary of pressure drop given above is an over simplification. This is a very complex part of the design and operation of a nuclear reactor. Having said this much, one point must be stressed. Pressure drop within the individual fuel bundles of a boiling water must remain substantially unchanged. Accordingly, if apparatus for preventing debris entrainment into the fuel bundles is going to be utilized, appreciable change in overall fuel bundle pressure drop should be avoided.

Having carefully reviewed the requirements for the avoidance of increased pressure drop in debris restricting devices, several further comments can be made.

First, any debris catching arrangement should be sufficiently rigid so that the excluding apparatus does not under any circumstance break apart, fail to stop debris, and become the source of further debris itself. For this reason, wire screens are not used. Instead, perforated metal is in all cases utilized in the examples that follow.

Second, we have found that it is desirable to restrict pressure drop to a minimum. This can be done by making the velocity of flow through the apertures themselves as low as feasible. A second reason for this limitation is the entrainment of the debris in the flow. Assuming entrainment of debris in the flow, if any possible angle of attack can be realized that will enable debris to pass through an aperture, given sufficient time, passage through the aperture will eventually occur. By maintaining slow velocity at the respective apertures, entrainment of debris is less likely to occur. Further, it has been found that a reorientation of the flow at a rejecting hole to an angle where debris passage is less likely can be achieved. Consequently, flow velocity at restricting apertures is restricted to the minimum possible value.

Third, we find that modification of the rod supporting grid—a technique utilized in the prior art—is not satisfactory. Specifically, we prefer to use straining apertures that are as small as possible—down to a dimension of 0.050 of an inch diameter. Unfortunately, the rod supporting grid is a member that must have the required static and dynamic properties to support the fuel rods under all conceivable conditions. Utilizing a matrix of such holes in the rod supporting grid at the pitches required for low pressure drop in the lower tie plate is not practicable. First, since the small apertures would be confined to the plane of the rod supporting grid, a total reduction of flow area will be present that would lead both to unacceptable pressure drop as well as high flow velocities through the individual holes in rod supporting grid. Further, such a matrix of small apertures in the rod supporting grid would reduce the strength of the grid to a level below that required for support of the fuel rods.

We have identified the so-called flow volume of the lower tie plate assembly as a primary candidate for the location of debris rejection apparatus—preferably the perforated metal utilized with this construction. In boiling water nuclear reactor fuel bundles at the lower tie plate assembly, there is defined between the nozzle at the lower end and the fuel rod supporting grid at the upper end, a relatively large open flow volume. This flow volume is sufficiently large to accommodate a three dimensional structure—with one side of the three dimension structure communicated to the nozzle inlet and the other side of the three dimensional structure communicated to the rod supporting grid. At the same time, periphery of the three dimensional supporting structure can be attached to the sides of the lower tie plate assembly—so that all fluids passing through the flow volume of the lower tie plate simply must pass through the restricting apertures of the perforated plate. Only small modification to the lower tie plate assembly is required.

The flow volume in the lower tie plate assembly has an additional advantage. Specifically, and if the flow restricting grid has to be confined to a plane extending across the lower tie plate flow volume, the apertures in the plate would define a total flow area less than the plane in which the perforated plate was disposed. Where a perforated plate is utilized to manufacture a three dimensional structure, the area of the available apertures can increase beyond that total area possible when the perforated plate is confined to a flat plane. In fact, where sufficient structure is utilized, the total flow area available in the aggregated holes of the three dimensional structure can approach and even exceed the total cross sectional area across the flow volume of the lower tie plate assembly before the insertion of the debris restricting assembly. In addition a properly designed debris catcher assembly could improve the flow distribution at the inlet to the fuel bundle.

Having set forth these considerations, attention can be directed to the embodiments of the invention.

Figure 2A:
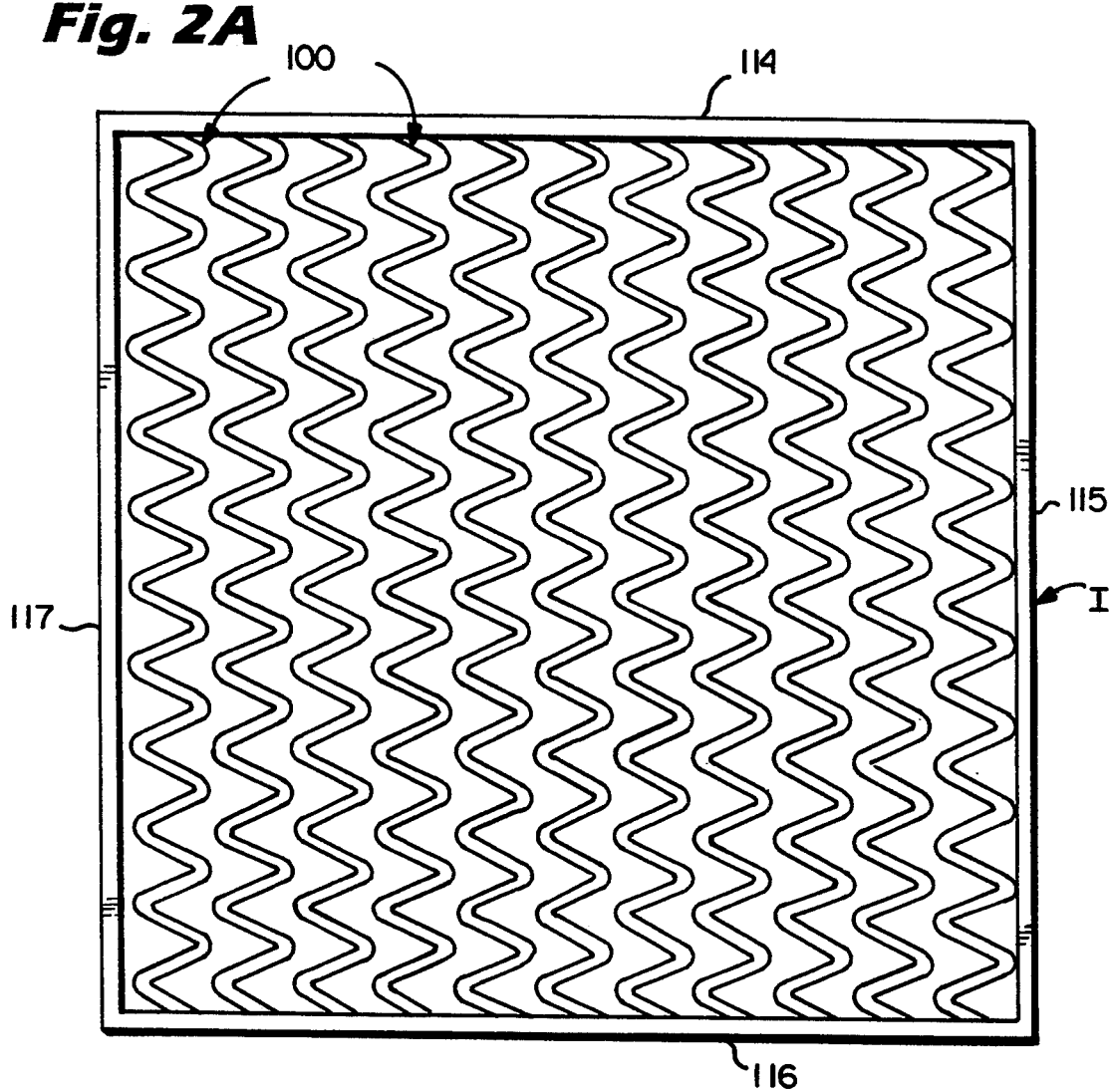
FIGS. 2A and 2B are respective plan and side elevations of a single layer of helical springs placed in side-by-side relation in a filter attachment for placement within the plenum of a lower tie plate.
Figure 2B:
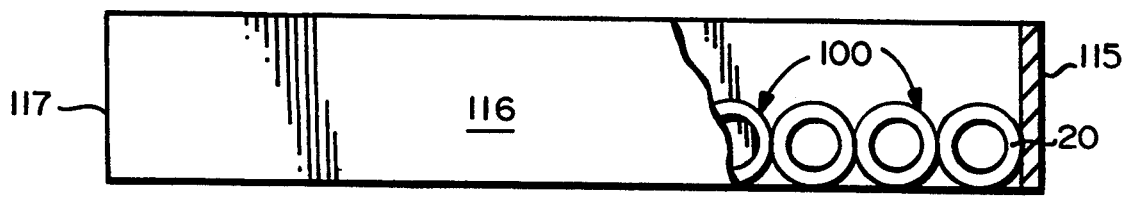
Figure 6:
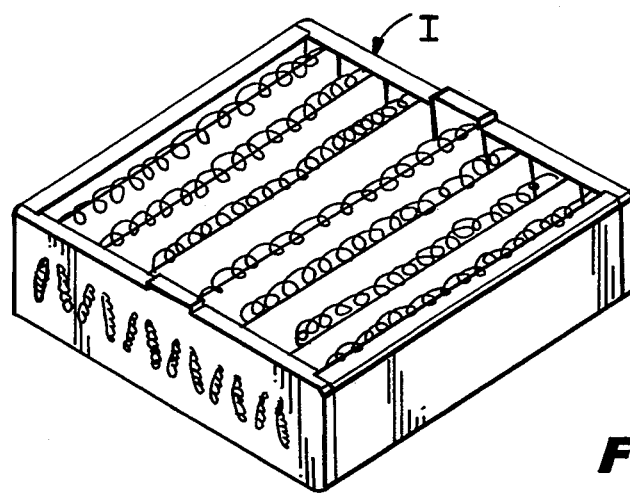

Referring to FIG. 6, a typical filter insert I for placement of the filter apparatus of this invention to a lower tie plate T within the plenum P is illustrated. FIGS. 2A and 2B contain the respective plan and side elevation views of the disclosed helical spring matrix strainer.

Figure 3:
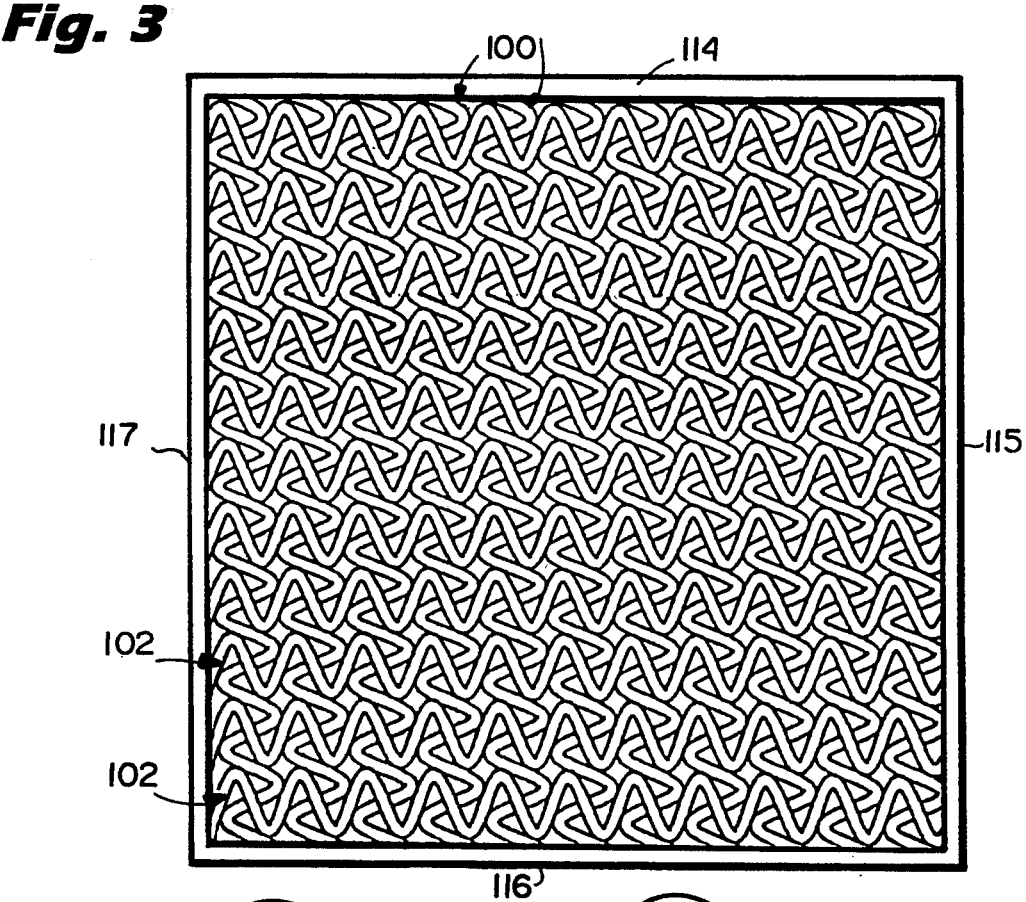
FIG. 3 is a plan view similar to FIG. 2A illustrating two layers of helical springs placed in the filter attachment illustrating the resulting filtering flow path.

Referring to FIG. 2A, a plurality of side-by-side springs 100 are shown fastened between opposite walls 114, 116. Looking at FIG. 3, it can be seen that an additional second layer 102 of side-by-side helical springs has been added. These side-by-side helical springs extend between walls 115, 117 at an approximate 90° angle with respect to springs 100.

Figure 4:
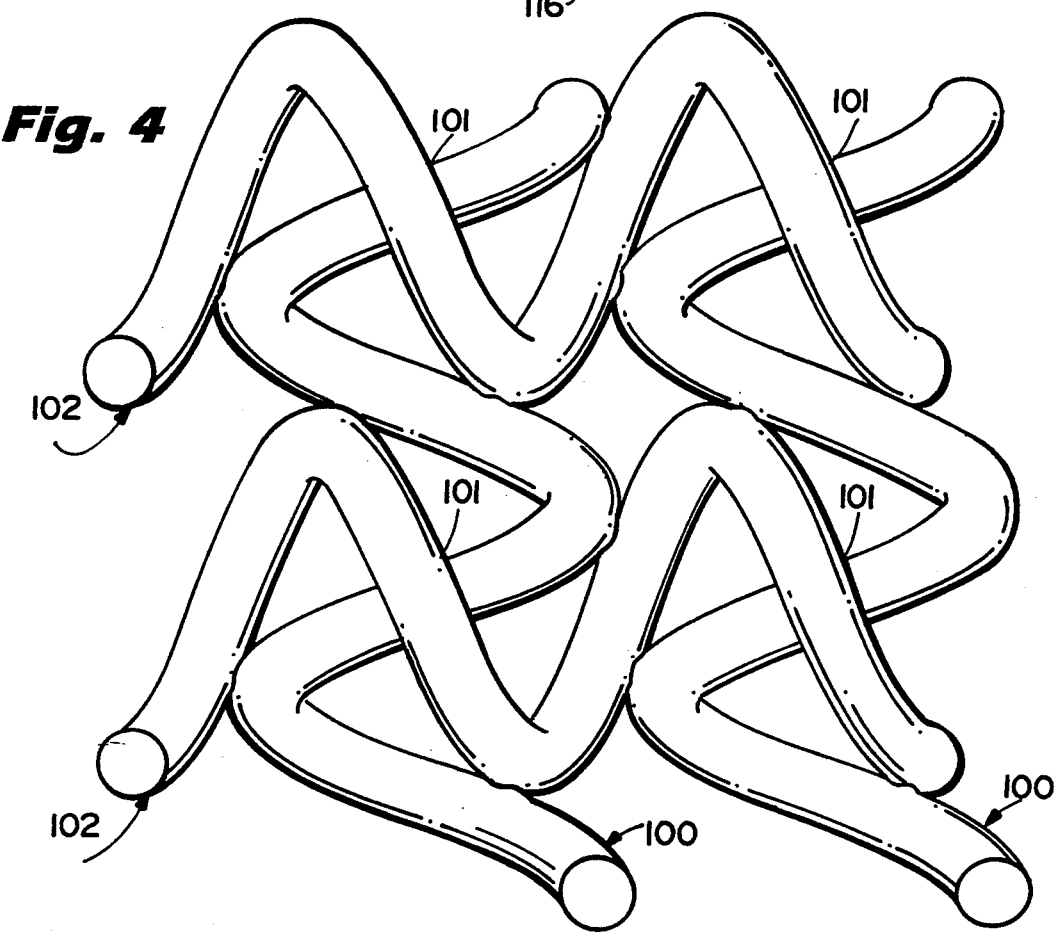
FIG. 4 is an enlargement of a portion of the filter of FIG. 3 illustrating the flow path developed by two crossing layers of helical springs and also illustrating the points of attachment of the springs one to another for the fastening of the entire filter structure into a unitary mass.

Referring to FIG. 4, an expanded view of springs 100, 102 is illustrated. It can be seen that these respective spring intersect one another at intersections 101. It is preferred that the springs be attached as by welding at these junctures. This attachment forms a unitary mass from the spring matrix to prevent the individual springs from becoming debris themselves should failure of the individual spring matrix occur.

Figure 5:
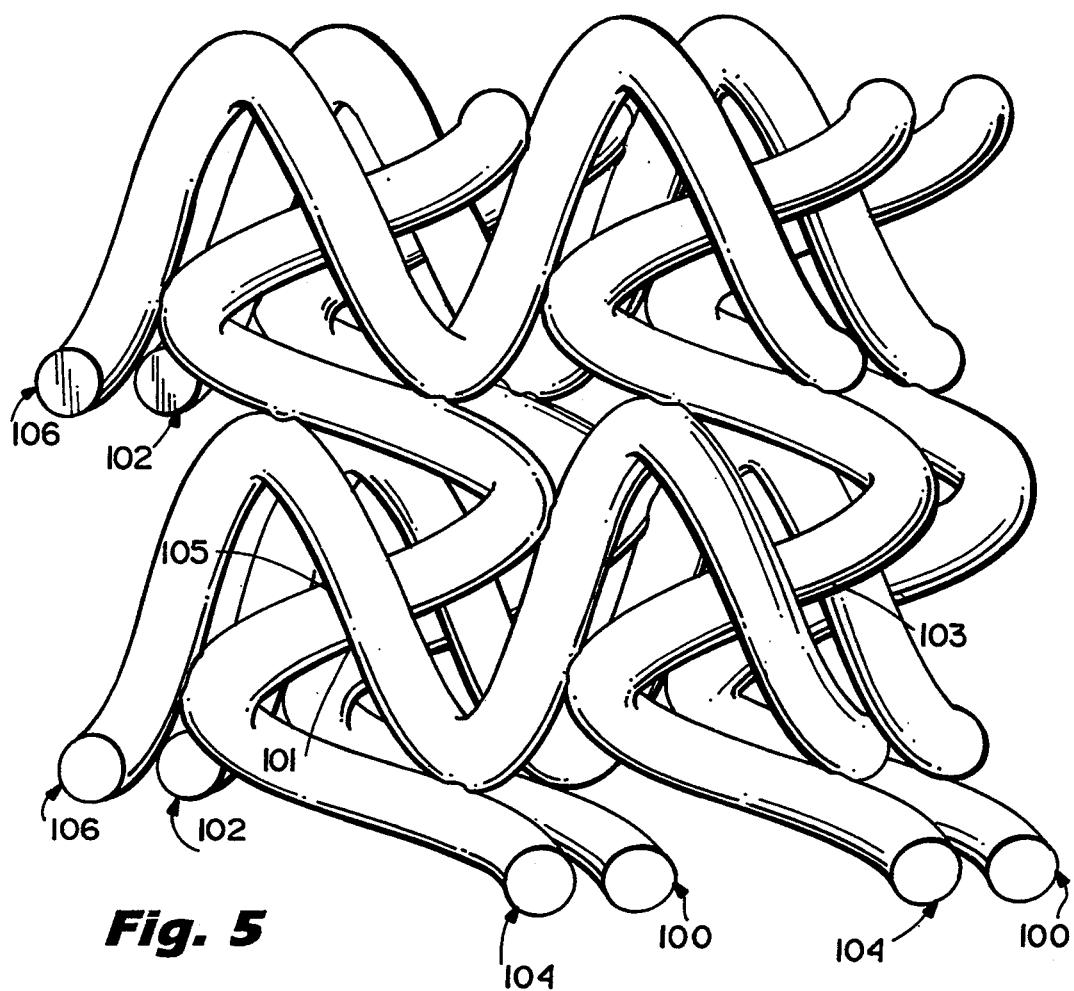
FIG. 5 is an enlargement similar to FIG. 4 illustrating the preferred embodiment having four layers of springs for forming the filter mass; and, FIG. 6 shows several layers of springs enclosed in a box structure to form a filter which can be inserted into the plenum region of the lower tie plate.

Referring to FIG. 5, it is preferred that four layers of springs 100, 102, 104, and 106 be utilized. As illustrated, layers 100, 104 are at 90° angles with respect to layers 102, 106 with the layers alternating in their angularity. Again—and where the layers cross one another —fastening of the springs one to another occurs at points 101, 103, and 105 so that the springs as finally bound together form a unitary mass. The preferred method of such fastening is presently by welding—although other forms of fastening may be obviously used.

Referring further to FIG. 5, just as the springs form a matrix, the filter formed has a series of endlessly interconnected passages. This being the case, local fill with debris will not appreciably interrupt intended flow as alternate channels permitting such flow communicate across the entire filter.

What is claimed is:

1. In a boiling water reactor fuel bundle which includes a lower tie plate assembly having a fuel rod supporting tie plate grid and an inlet nozzle with an open flow volume defined therebetween, a debris catching grid construction for placement within the open flow volume comprising:
   at least a first layer of helical springs, said helical springs being placed in side-by-side parallel relation;
   at least a second layer of helical springs, said helical springs being placed in side-by-side parallel relation at an angle with respect to said first layer of helical springs so as to intersect at a first plurality of crossing points, said first and second layers of helical springs forming a filter mass within said open flow volume.

2. In a boiling water reactor fuel bundle, a debris catching grid construction according to claim 1 wherein means are provided for fastening said first and second layers together at said first plurality of crossing points.

3. In a boiling water reactor fuel bundle, a debris catching grid construction according to claim 1 and further including:
   at least a third layer of helical springs, said springs being placed in side-by-side parallel relation at an angle with respect to said second layer of helical springs and arranged to intersect said second layer at a second plurality of crossing points;
   at least a fourth layer of helical springs, said springs being placed in side-by-side parallel relation at an angle with respect to said third layer of helical springs so as to intersect said third layer at a third plurality of crossing points.

4. In a boiling water reactor fuel bundle, a debris catching grid construction according to claim 3 whereas means are provided for fastening said respective helical springs of said layers one to another at said first, second and third pluralities of crossing points whereby said first, second, third and fourth layers become a unitary filter mass.

5. In a boiling water reactor fuel bundle, comprising in combination:
   a lower tie plate assembly including a fuel rod supporting grid, an inlet nozzle, and sidewall extending between said nozzle to the edges of said grid to define therebetween an open flow volume interior of said tie plate;
   a plurality of upstanding fuel rods, said fuel rods supported on said rod supporting grid and extending in upstanding vertical side-by-side relation;
   an upper tie plate for supporting at least some of fuel rods and providing connection to said lower tie plate through at least some of said fuel rods;
   at least a first layer of helical springs, said springs being placed in side-by-side parallel relation;
   at least a second layer of helical springs, said springs being placed in side-by-side parallel relation at an angle with respect to said first layer of helical springs so as to intersect at a first plurality of crossing points, said first and second layers of helical springs forming a filter mass within said open flow volume; and
   means mounting said layers of helical springs in said open flow volume of said lower tie plate.

6. In a boiling water reactor fuel bundle, a debris catching grid construction according to claim 5 wherein means are provided for fastening said first and second layers together at said first plurality of crossing points.

7. In a boiling water reactor fuel bundle, a debris catching grid construction according to claim 5 and further including:
   at least a third layer of helical springs, said springs being placed in side-by-side parallel relation at an angle with respect to said second layer of helical springs and arranged to intersect said second layer at a second plurality of crossing points;
   at least a fourth layer of helical springs, said springs being placed in side-by-side parallel relation at an angle with respect to said third layer of helical springs so as to intersect said third layer at a third plurality of crossing points.

8. In a boiling water reactor fuel bundle, a debris catching grid construction according to claim 5 whereas means are provided for fastening said respective helical springs of said layers one to another at said first, second and third plurality of crossing points whereby said first, second, third and fourth layers become a unitary filter mass.

* * * * *